(12) United States Patent
Farrell et al.

(10) Patent No.: US 11,767,769 B2
(45) Date of Patent: Sep. 26, 2023

(54) METHOD AND SYSTEM FOR TESTING A SENSOR OF A PROPELLER BLADE ANGLE POSITION FEEDBACK SYSTEM

(71) Applicant: PRATT & WHITNEY CANADA CORP., Longueuil (CA)

(72) Inventors: Ian Farrell, Greenfield Park (CA); Ella Yakobov, Montreal (CA); Steve Fett, Kirkland (CA); Josee Marotte, Bolton-Est (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 356 days.

(21) Appl. No.: 17/119,163

(22) Filed: Dec. 11, 2020

(65) Prior Publication Data
US 2022/0186632 A1 Jun. 16, 2022

(51) Int. Cl.
*F01D 21/00* (2006.01)

(52) U.S. Cl.
CPC ........ *F01D 21/003* (2013.01); *F05D 2260/80* (2013.01); *F05D 2260/83* (2013.01); *F05D 2270/304* (2013.01); *F05D 2270/80* (2013.01)

(58) Field of Classification Search
CPC .............. F01D 21/003; F05D 2260/80; F05D 2260/83; F05D 2270/304; F05D 2270/80; G01D 3/08; G01D 5/24461; G01D 2218/10; G01P 3/483; G01P 3/486; G01P 3/487; G01P 3/488; G01P 21/02
See application file for complete search history.

(56) References Cited

U.S. PATENT DOCUMENTS

| | | | |
|---|---|---|---|
| 9,821,901 B2 | 11/2017 | Duke et al. | |
| 10,822,105 B2 | 11/2020 | Yakobov et al. | |
| 10,851,657 B2 | 12/2020 | Polo Filisan et al. | |
| 2018/0050816 A1 | 2/2018 | Yakobov | |
| 2020/0017234 A1 | 1/2020 | Marone et al. | |

FOREIGN PATENT DOCUMENTS

CN 110186370 A 8/2019

OTHER PUBLICATIONS

European Patent Office, Communication re. extended European search report for European patent application No. 21213542.0, dated Apr. 19, 2022.
Wikipedia, Calibration, pp. 1-11, https://en.wikipedia.org/w/index.php?title+Calibration&oldid=899059621, last edited on May 27, 2019, accessed on Feb. 2, 2022.

*Primary Examiner* — J. Todd Newton
(74) *Attorney, Agent, or Firm* — Norton Rose Fulbright Canada LLP

(57) ABSTRACT

Methods and systems for testing a sensor of a propeller blade angle position feedback system are described. A sensor signal is received from a sensor at a known position relative to a feedback device, the feedback comprising a ring and at least one pair of position markers spaced from one another around a circumference thereof, the sensor configured for successively detecting passage of the position markers as the feedback device rotates at a known rotational speed and an axial distance between the sensor and the feedback device varies. From the sensor signal a measured position of the sensor relative to the feedback device and a measured rotational speed of the feedback device are determined. The measured position and the measured rotational speed are compared to the known position and the known rotational speed to determine a sensor accuracy.

20 Claims, 9 Drawing Sheets

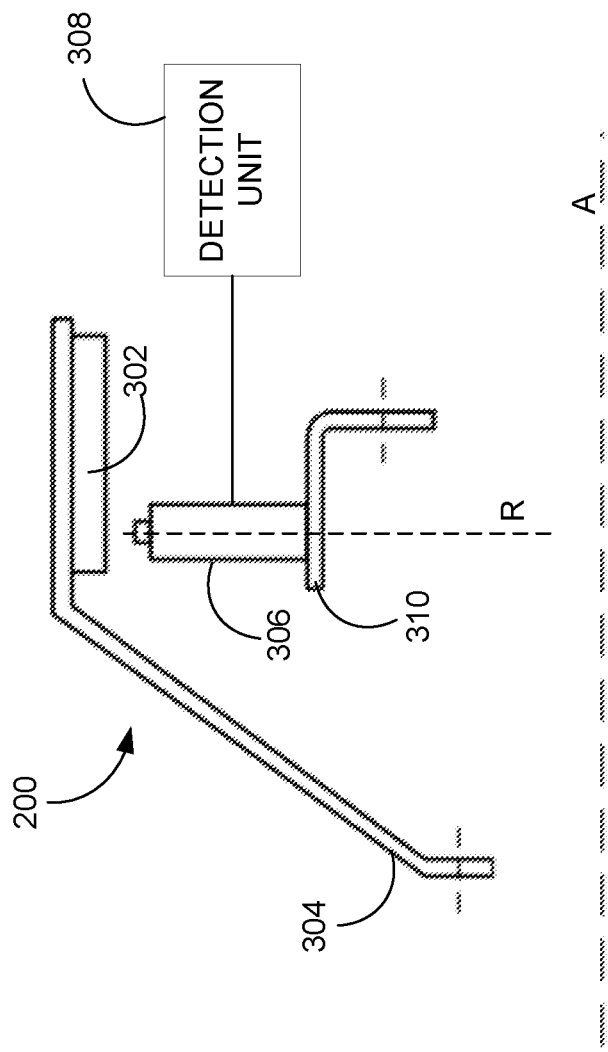

METHOD AND SYSTEM FOR TESTING A SENSOR OF A PROPELLER BLADE ANGLE POSITION FEEDBACK SYSTEM

TECHNICAL FIELD

The disclosure relates generally to sensor accuracy and, more particularly, to testing sensors used in a propeller blade angle position feedback system.

BACKGROUND OF THE ART

On reversing propeller systems, it is desirable to accurately measure the propeller blade (or beta) angle. In this manner, it becomes possible to ensure that the blade angle is controlled according to the engine power set-point requested in reverse operation. Accurate measurement of the blade angle also ensures that the propeller is not inadvertently commanded to transition into low or reverse beta angles, which would cause a potentially serious condition for the aircraft.

A sensor may be used in conjunction with other components to measure angular position or rotational speed of a shaft and thus provide the propeller blade angle. The accuracy of the measurements of the propeller blade angle are directly related to the accuracy of the sensor. While existing methods for determining whether a sensor is manufactured in accordance with acceptable tolerances are suitable for their purposes, improvements are desirable.

SUMMARY

In one aspect, there is provided a computer-implemented method for testing a sensor of a propeller blade angle position feedback system. The method comprises receiving a sensor signal from a sensor at a known position relative to a feedback device, the feedback comprising a ring and at least one pair of position markers spaced from one another around a circumference thereof, the sensor configured for successively detecting passage of the position markers as the feedback device rotates at a known rotational speed and an axial distance between the sensor and the feedback device varies; determining from the sensor signal a measured position of the sensor relative to the feedback device and a measured rotational speed of the feedback device; comparing the measured position and the measured rotational speed to the known position and the known rotational speed to determine a sensor accuracy; and accepting sensors with sensor accuracy above a threshold and rejecting sensors with sensor accuracy below the threshold.

In another aspect, there is provided a system for testing a sensor of a propeller blade angle position feedback system. The system comprises a processing unit and a memory having stored thereon program instructions. The program instructions are executable by the processing unit for receiving a sensor signal from a sensor at a known position relative to a feedback device, the feedback comprising a ring and at least one pair of position markers spaced from one another around a circumference thereof, the sensor configured for successively detecting passage of the position markers as the feedback device rotates at a known rotational speed and an axial distance between the sensor and the feedback device varies; determining from the sensor signal a measured position of the sensor relative to the feedback device and a measured rotational speed of the feedback device; comparing the measured position and the measured rotational speed to the known position and the known rotational speed to determine a sensor accuracy; and accepting sensors with sensor accuracy above a threshold and rejecting sensors with sensor accuracy below the threshold.

Features of the systems, devices, and methods described herein may be used in various combinations, in accordance with the embodiments described herein. In particular, any of the above features may be used together, in any combination.

DESCRIPTION OF THE DRAWINGS

Reference is now made to the accompanying figures in which:

FIG. 3A is an example of a propeller blade angle feedback system;

DETAILED DESCRIPTION

Figure 1:
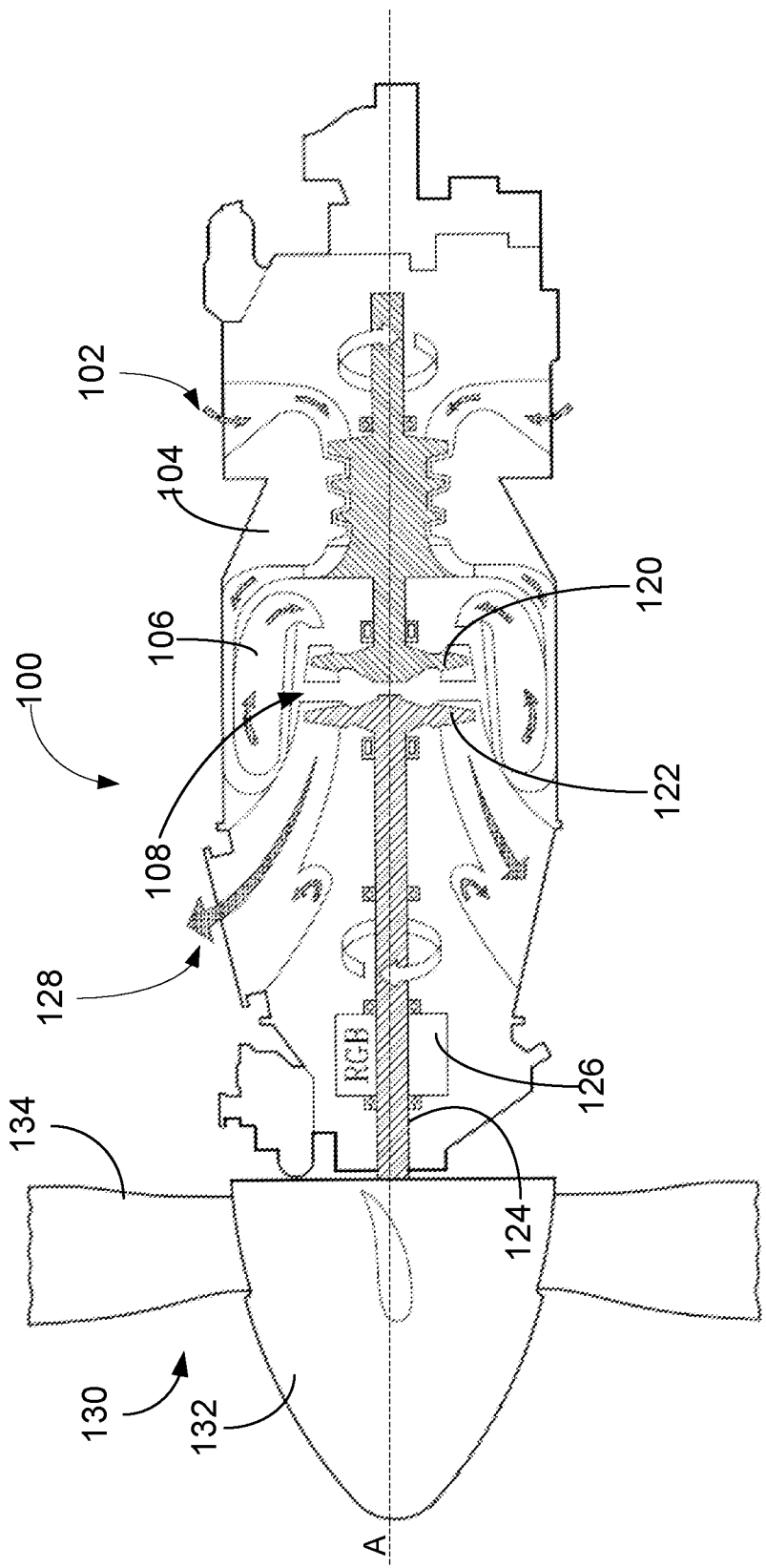
FIG. 1 is a schematic cross sectional view of a gas turbine engine.

FIG. 1 illustrates a gas turbine engine 100, of a type typically provided for use in subsonic flight, comprising an inlet 102, through which ambient air is propelled, a compressor section 104 for pressurizing the air, a combustor 106 in which the compressed air is mixed with fuel and ignited for generating an annular stream of hot combustion gases, and a turbine section 108 for extracting energy from the combustion gases. The turbine section 108 illustratively comprises a compressor turbine 120, which drives the compressor assembly and accessories, and at least one power or free turbine 122, which is independent from the compressor turbine 120 and rotatingly drives a rotor shaft 124 about a propeller shaft axis A through a reduction gearbox 126. Hot gases may then be evacuated through exhaust stubs 128. A rotor 130, in the form of a propeller through which ambient air is propelled, is hosted in a propeller hub 132. Rotor 130 may, for example, correspond to a propeller of a fixed-wing aircraft or a main (or tail) rotor of a rotary-wing aircraft such as a helicopter. The rotor 130 may comprise a plurality of circumferentially-arranged blades 134 connected to the hub 132 by any suitable means and extending radially therefrom.

Figure 2:
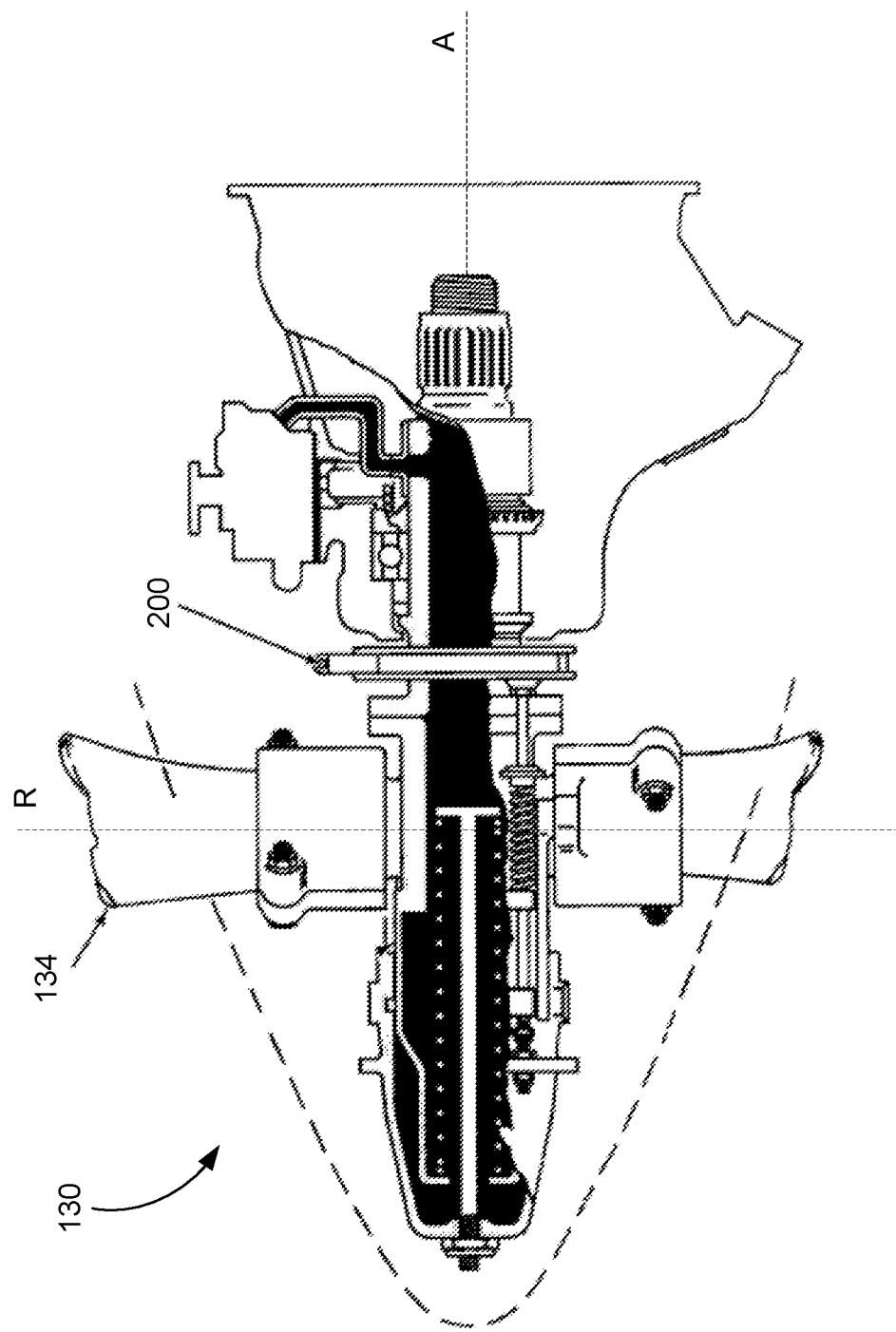
FIG. 2 is an enlarged cross sectional view of the propeller of the gas turbine engine of FIG. 1.

As depicted in FIG. 2, the plurality of angularly arranged blades 134 are each rotatable about a radially-extending axis R through a range of adjustable blade angles, the blade angle being the angle between the chord line (i.e. a line drawn between the leading and trailing edges of the blade) of the propeller blade section and a plane perpendicular to the axis of propeller rotation. A feedback device 200 provides blade (or beta) angle position feedback during rotation of the propeller 130. Generally, and with reference to FIG. 3A, the feedback device 200 is composed of a ring 304 and a plurality of position markers 302 that rotate with the ring 304 about axis A. During operation of the propeller 300, a sensor 306 is positioned in a fixed relationship relative to the rotating propeller components. The sensor 306 may be a variable reluctance sensor, a capacitive sensor, a hall effect sensor, and the like. It detects passage of the position markers 302 and generates a sensor signal indicative of the passage of the position markers. The sensor 306 and feedback device 200 are configured for relative axial displacement, which is generally provided by having the sensor 306 fixed and the ring 304 displaceable axially. The sensor 306 may, for example, be fixedly attached to a flange 310 of the propeller 130. A detection unit 308 is connected to the sensor 306 for receiving the sensor signal therefrom, determining on the basis of the sensor signal a time interval elapsed between passage of the position markers 302, and computing from the time interval a blade angle position for the plurality of blades 134.

There are described herein methods and systems for testing the sensor 306 to determine whether the sensor 306 is within acceptable manufacturing tolerances. Such tests are performed separately from the engine 100, and the propeller 130 as this environment provides certain mechanical and operational restrictions. In addition, testing facilities may not be capable of replicating the entire engine operating envelope which can be expected during flight, which may prevent certification of parts or all of the arrangement. As such, the components used for testing are the sensor 306, the feedback device 200, and a testing system. Although FIG. 3A shows a configuration with the sensor 306 being radially internal to the ring 304, alternate embodiments can have a sensor which is radially external to the ring and oriented radially inwardly. In an alternate embodiment, the arrangement can be as presented in U.S. Pat. No. 10,822,105 and US Patent Application Publication No. 2020/0017234 for example.

In some embodiments, a test mount is used to validate the accuracy of the arrangement, which includes the feedback device 200 and the sensor 306. An arrangement as presented in US Patent Application Publication No. 2020/00017234 can measure blade pitch based on the relative axial position between the ring and the probe, the relative axial position changing based on blade pitch. Accordingly, for testing such an arrangement, and to be able to simulate changes in blade pitch, the test mount should allow for changes in relative axial position between the ring 304 and the sensor 306 in addition to a precisely controlled rotation speed of the ring 304. The required degree of precision/accuracy in the determination of the relative axial position to allow determining the blade pitch with a sufficient degree of precision can be very high, such as in the order of 0.001", while also allowing for the required relative movements between the components.

Figure 3B:
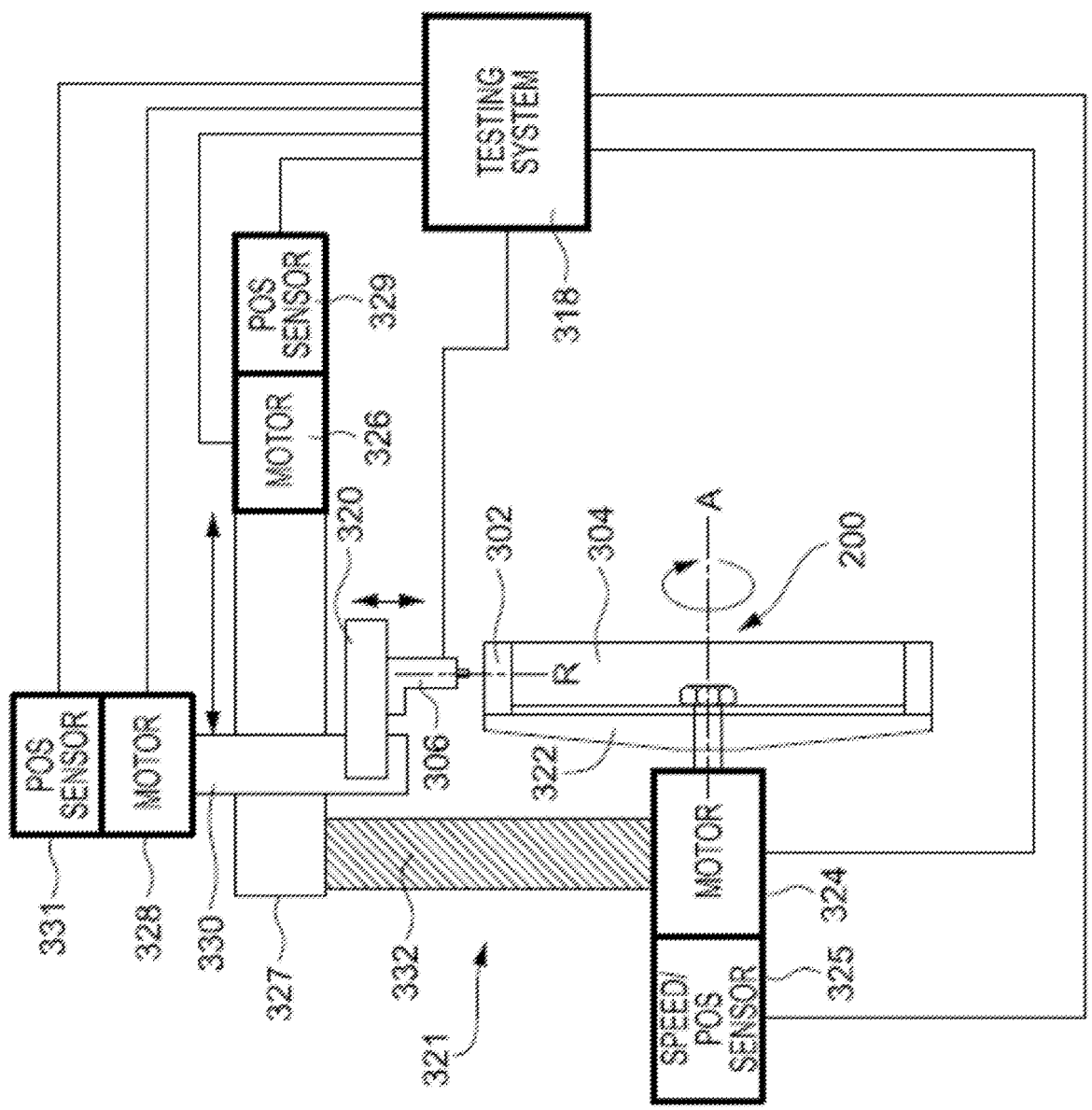
FIG. 3B is an example of a setup for testing sensor accuracy of the sensor of FIG. 3A.

A test mount 321 as illustrated in FIG. 3B may be used to determine whether the sensor 306, the ring 304, or one or more other components of the arrangement, can be certified for flight and/or are otherwise within acceptable manufacturing tolerances. The sensor 306 and feedback device 200 are mounted to the test mount 321. A testing system 318 is operatively coupled to the sensor 306 for running one or more tests thereon. The test mount 321 is designed to provide precise alignment of the sensor 306 relative to the feedback device 200, as well as radial and axial traverse alignment with the rotational axis A of the ring 304.

On the engine, the ring 304 spins while also moving axially with changing propeller blade angle, while the stationary sensor 306 detects the passing position markers 302 which are used to calculate the propeller speed and axial position of the ring 304. In accordance with some embodiments, the ring 304 is mounted to a ring holder 322 and spins using a first motor 324 while remaining stationary in the axial direction. The position of the sensor 306 relative to the ring 304 is set using a second motor 326 and a third motor 328. The second motor 326 moves the sensor 306 in the axial direction (i.e. along axis A). The third motor 328 moves the sensor 306 in the radial direction (i.e. along axis R) to adjust the air gap between the sensor 306 and the position markers 302, which simulates the variation of the radial air gap between the sensor 306 and the ring 304 due to engine stack-up. The sensor 306 is mounted to a sensor holder 320 coupled to a radial traverse 330 of the motor 328. The radial traverse 330 is coupled to an axial traverse 327 of the motor 326. The radial and axial traverse assembly and the motor 324 are mechanically coupled to a frame portion 332 of the test mount 321. It will be understood that the embodiment shown in FIG. 3B is an example setup for the test mount 321 and many variations may apply. For example, in an alternative embodiment, the sensor 306 is fixed along axis A and the ring 304 is axially displaceable along axis A. In another example, the radial traverse 330 and motor 328 may be omitted.

The ring 304 is rotated at a known speed using motor 324. In some embodiments, the motor 324 is a servo motor, which can be an AC or DC servo motor. The motor 324 should be capable of performing the maximum propeller acceleration/deceleration rates recorded on an actual engine, such as engine 100. A speed command may be provided to the motor 324 from the testing system 318 or from a separate device for controlling speed of the feedback device 200. In some embodiments, the motors 326, 328 are stepper motors or servo motors controlled by the testing system 318. A step rate or velocity command and direction is sent from the testing system 318 to the motors 326, 328 in order to position the sensor 306 at a desired location. A motor speed feedback device 325 may be mechanically coupled to motor 324 and communicatively coupled to the testing system 318. The sensor used for the motor speed feedback device 325 may be a rotary encoder (magnetic or optical), resolver, variable reluctance probe, etc. An axial traverse position feedback device 329 may be mechanically coupled to the motor 326 or between sensor holder 320 and frame portion 332, and communicatively coupled to the testing system 318. When coupled to the motor 326, the axial traverse position feedback device 329 is of a rotary type and may be a rotary encoder (magnetic or optical), resolver, variable reluctance probe, and the like. When coupled between the sensor holder 320 and the frame portion 332, the axial traverse position feedback device 329 is of a linear type and may be a magnetic or optical linear encoder, a Linear Variable Differential Transformer (LVDT), a laser displacement probe, a mechanical micrometer or depth gauge, and the like. The sensor used for the radial traverse position feedback device 331 may be a rotary type (i.e. rotary encoder (magnetic or optical), resolver, variable reluctance probe, and the like) or a linear type (i.e. magnetic or optical linear encoder, a Linear Variable Differential Transformer (LVDT), a laser displacement probe, a mechanical micrometer or depth gauge), with manual or automatic actuation.

The position of the holder 320 relative to the ring holder 322 can be precisely determined using calibration. The sensor 306 and the ring 304 can then be precisely set into the corresponding holders 320, 322. The sensor 306 can then provide its own indication of the axial position of the ring 304 relative to the sensor 306. If the reading from the sensor 306 deviates from the calibration in excess of a certain threshold value, the sensor 306 can be rejected. If the reading from the sensor 306 deviates from the calibration by a value which remains within a tolerance, the sensor 306 can be approved, or further testing can be conducted. In some embodiments, an offset corresponding to the deviation can be applied to sensor readings in order to correct the measurement to the calibrated value for all further tests to be conducted. The axial traverse 327 can then be used to change the axial position of the sensor 306 relative to the ring 304 and the readings from the sensor 306 can be compared to expected values based on the axial traverse position information obtained from the test mount 321, in various simulated flight scenarios, to determine whether the readings taken at other axial positions are correct (within allowed tolerances) or not.

In some embodiments, there may be some tolerance in the ultimate radial or axial position between the ring 304 and the sensor 306 on the engine 100. This tolerance can extend from zero, or a perfect relative position between the sensor 306 and the ring 304, to one or two "worse case scenarios" corresponding to the greatest possible deviations from the perfect position which could be allowed within manufacturing tolerances. The testing performed using the test mount 321 may simulate the best and worse case scenarios. To this end, the radial traverse 330 of the test mount 321 can be used to change the relative radial position between the sensor 306 and the ring 304 between a simulated perfect radial position (or perfect air gap), and a simulated worse case position (e.g. a maximum possible air gap), for instance. Similarly, and if relevant, the axial traverse 327 can be used to perform similar testing for simulating possible variations in the axial position due to an eventual axial manufacturing tolerance on the engine 100.

Figure 4A:
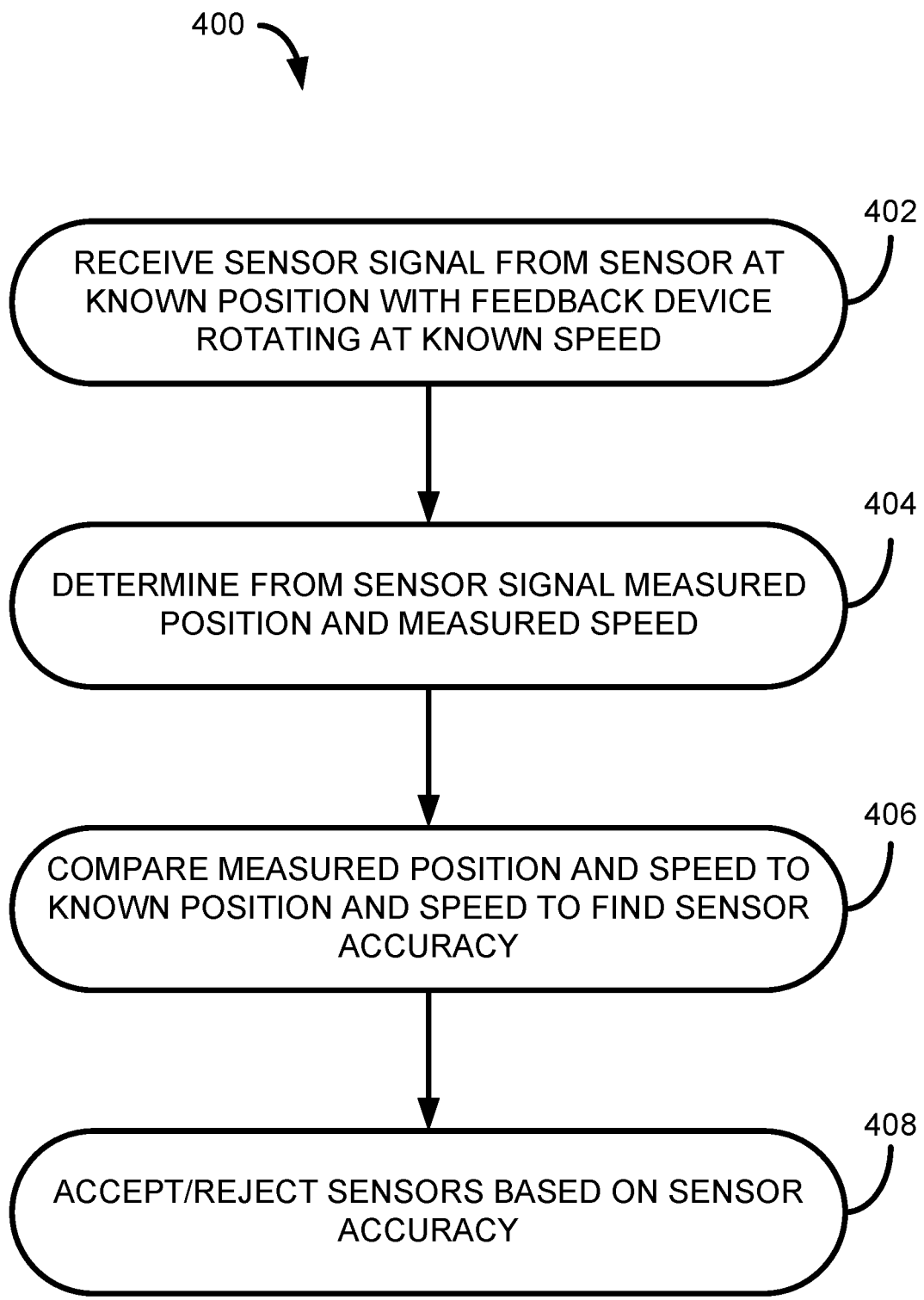
FIGS. 4A-4D are flowcharts of example methods for testing sensor accuracy.

The testing system 318 is configured for testing the sensor in accordance with a method 400 as illustrated in FIG. 4A. At step 402, a sensor signal is received from the sensor 306 while the sensor 306 is positioned relative to the feedback device 200 at a known position, and the feedback device 200 is rotating at a known speed. In some embodiments, the testing system 318 sends control signals to one or more motors, such as motors 324, 326, 328 to cause the feedback device 200 to rotate at the known speed and to cause the sensor 306 to be placed at the known position. Alternatively, these settings are provided independently from the testing system 318.

The sensor 306 may be a variable reluctance sensor that detects the change in presence or proximity of the position markers 302 and outputs a semi-sinusoidal signal in response. The amplitude of the signal is highest when the position markers 306 are closest to the sensor 306 and lowest when the position markers 306 are furthest from the sensor 306. The sensor may be a passive sensor or an active sensor. For a passive sensor, the semi-sinusoidal signal is processed by the testing system 318 in order to get a waveform that can be more readily counted and timed. For example, a zero-crossing detector circuit may be used to generate a square pulse train from the semi-sinusoidal signal. Any design for a zero-crossing detector may be used.

At step 404, a measured position and a measured speed are determined from the received sensor signal. The measured position may be an axial position, a radial (air gap) position, or a combination thereof. For example, the time period between edge transitions of the square pulse train may be measured and used to calculate the relative position (parallel to axis A in FIG. 3B) between the feedback device 200 and the sensor 306 and to determine the rotational speed of the feedback device 200. These calculated values become the measured position and measured speed, respectively. It will be understood that through step 404, the testing system 318 emulates the detection unit 308 used to determine the position and speed of the feedback device 200 as the propeller 130 rotates while in operation. In some embodiments, the measured position and measured speed are determined from the sensor signal as per the teachings of U.S. Pat. No. 10,435,140, the contents of which are hereby incorporated by reference in their entirety. Alternatively, other methods for determining the measured position and measured speed may be used.

At step 406, the measured position and speed are compared to the known position and speed to determine sensor accuracy, and may also be used to evaluate the accuracy of the position markers 302 or the detection unit 308 for investigation purposes. The differences between measured and known values may be compared to thresholds corresponding to acceptable accuracy deviations. At step 408, the sensor 306 is accepted or rejected based on the sensor accuracy. In other words, if the difference between the measured and known values exceeds the threshold, the sensor is rejected. If the difference between the measured and known values does not exceeded the threshold, the sensor is accepted. Different thresholds may be used for position and speed, in accordance with the specifications of the application. In some embodiments, a sensor 306 having only one out of two acceptable accuracies is rejected. More than two test points may also be used.

Figure 4B:
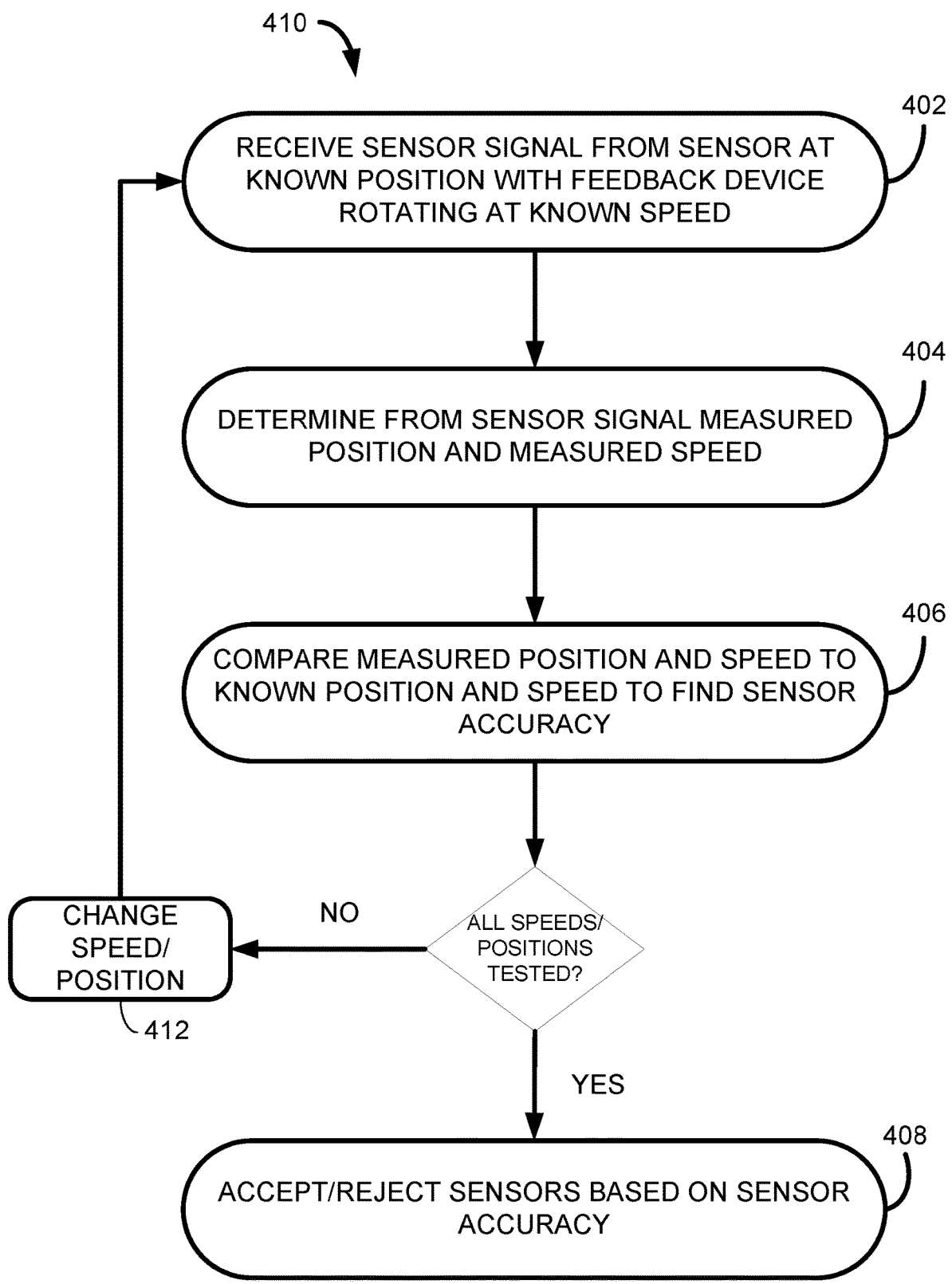

In some embodiments, at least one position signal is sent by the testing system 318 to at least one motor to set the sensor and feedback device to the known relative position. In some embodiments, at least one speed signal is sent by the testing system 318 to at least one motor to rotate the feedback device at the known rotational speed. In some embodiments, the method 400 is repeated at a plurality of rotational speeds and relative positions between the sensor 306 and the feedback device 200. An example method 410 is illustrated in FIG. 4B. At step 412, a change in speed and/or position is effected by changing the settings of the test mount 321, for example through control of the motors 324, 326, 328.

Figure 4C:
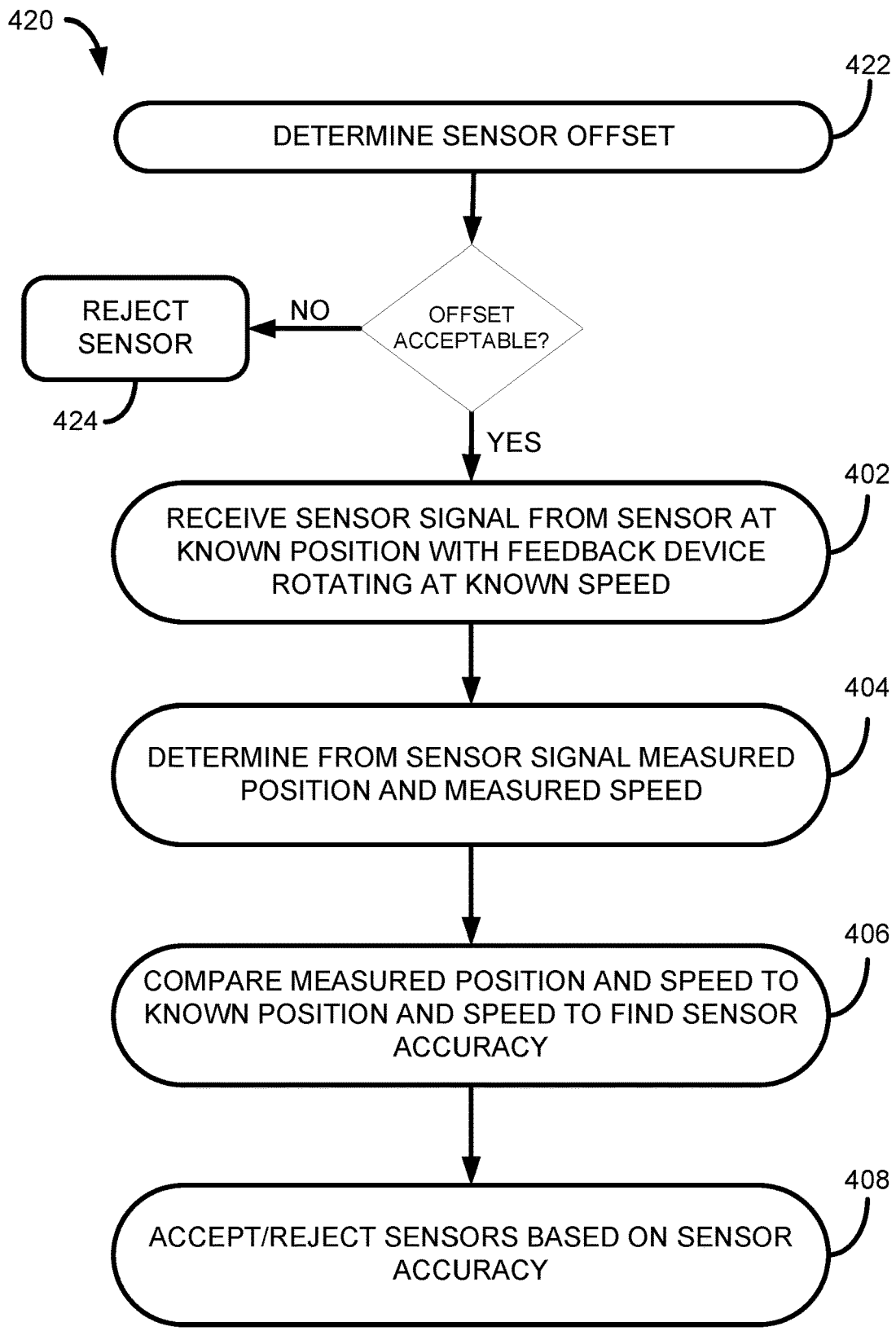

In some embodiments, the measured position of the sensor 306 relative to the feedback device 200 may include an offset that takes into account a tolerance of a pole piece of the sensor 306 and/or tolerance stack up of the testing system 318. Indeed, if the tolerance of the pole piece of the sensor is greater than the system level accuracy requirements, an offset is added to each measured position by the test system 318 to remove (or reduce) the effect caused by the discrepancy in tolerances. The offset may be input directly into the testing system 318 through a user interface. Alternatively, the testing system 318 may determine the offset. In some embodiments, the method 400 includes a step of determining the sensor offset, as shown in the example of FIG. 4C. The offset is determined at step 422 at the outset of method 420. In some embodiments, the offset is determined by positioning the sensor 306 at an offset determining position and setting the ring speed to an offset determining speed. The axial center of the ring 304 may be used as the offset determining position, due to the typically smaller magnetically induced axial position error at that point, but other positions may also be used. The offset determining speed is selected as a low speed at which a speed induced error may be eliminated. The offset is calculated by finding a difference between a measured position of the sensor 306 relative to the ring 304 and the offset determining position. This value may be added to all subsequent measured values, as found at step 404.

In some embodiments, the offset is also used to accept/reject the sensor 306, through a comparison with an offset threshold. If the offset is greater than the offset threshold, the sensor 306 is rejected at step 424. If the offset is within the bounds of the offset threshold, then the sensor 306 is accepted and the method 420 continues onto subsequent steps to determine sensor accuracy.

Figure 4D:
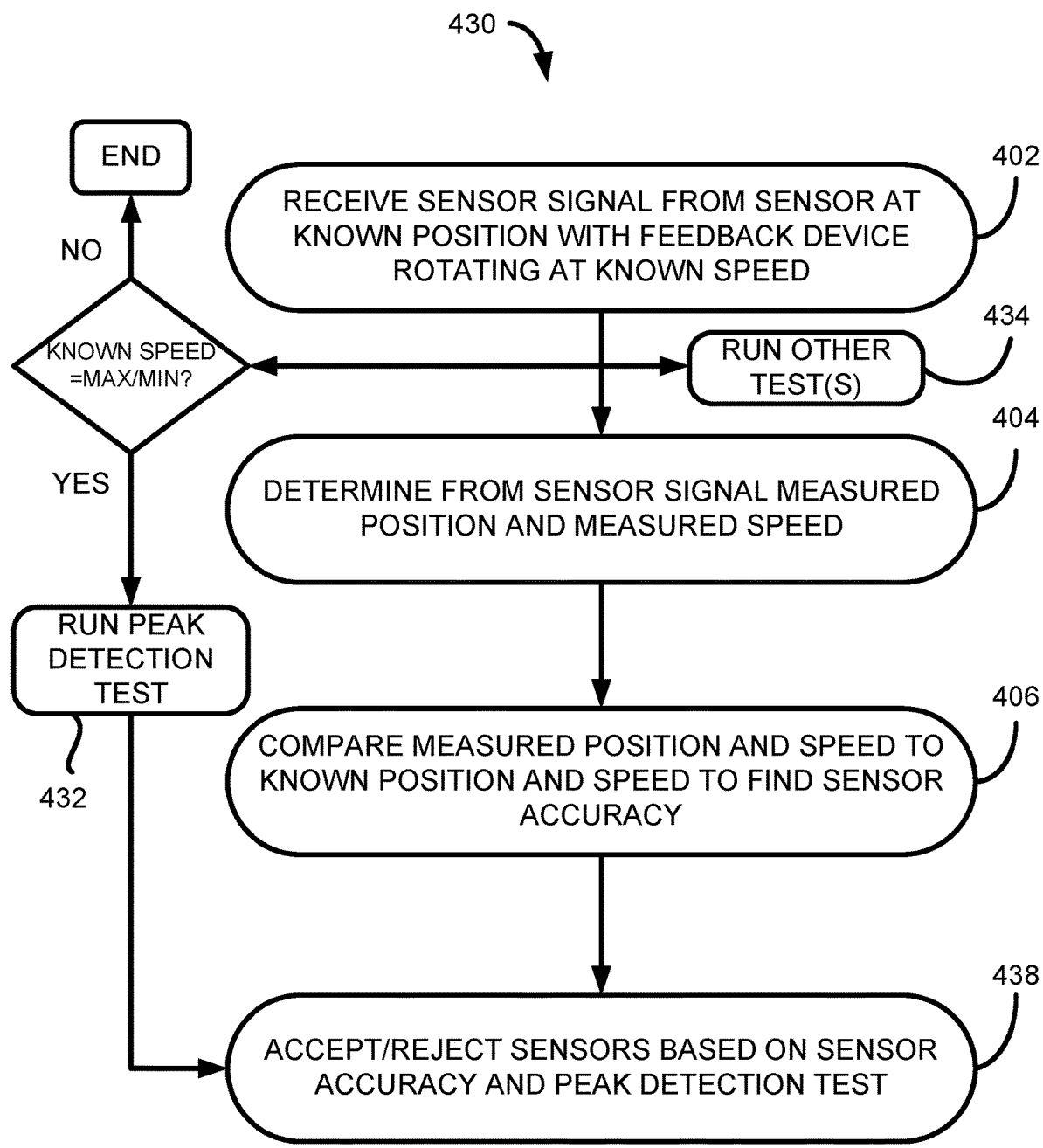

In some embodiments, one or more additional tests are run concurrently or sequentially with the sensor accuracy test, using the sensor signal received at step 402. An example is illustrated in FIG. 4D, where a peak voltage output detection test is performed at step 432 of method 430 concurrently with the sensor accuracy test. The peak detection test measures the minimum and maximum voltage magnitudes of the sensor 306 for each of the position markers 302, when the ring 304 is rotating at minimum and maximum speeds. This test may be triggered upon receipt of a sensor signal at step 402, when the known speed is the maximum or minimum speed. Alternatively, the test may be triggered from the measured speed, as determined at step 404.

Generally, the peak detection test selects and records the smallest positive and negative magnitudes of voltage over a complete ring revolution when the ring 304 is rotating at the minimum speed, and selects and records the largest magnitudes of voltage over a complete ring revolution when the ring 304 is rotating at the maximum speed. These values may be compared to minimum and maximum thresholds to ensure that the sensor 306 outputs a minimum voltage for all position markers 302 and that the maximum voltage does not exceed a maximum output voltage for optimal system accuracy. In the example illustrated, the outcome of the peak detection test is used to accept/reject the sensor at step 438 jointly with the sensor accuracy as determined at step 406. Alternatively, separate steps of accepting/rejecting the sensor are used, one based only on sensor accuracy and one based only on peak detection.

In another example of a test performed concurrently or sequentially to the sensor accuracy test, for example at step 434, a shorted coil test may be performed. When the sensor 306 is a dual coil design (each wound concentrically around the same pole piece), if one coil is shorted it will affect the axial positional reading accuracy of the other coil. The shorted coil test consecutively shorts each of the coils and simultaneously measures the positional reading accuracy of the un-shorted coil to ensure the accuracy shift is not beyond an acceptable value. In some embodiments, an averaging routing is incorporated in any of the methods 400, 410, 420, 430. The routine averages the measured position found at step 404 over one revolution of the ring 304. It performs it in a rolling buffer method were each new position marker passing enters a new time value in the buffer and the oldest value is discarded. One full revolution's worth of position marker passing times is stored in the buffer and used to calculate the average value.

Although the methods 400, 410, 420, 430 each show different features independently, it will be understood that various combinations may be used, such that two or more of the features shown in methods 400, 410, 420, 430 may be performed together in a single embodiment.

In some embodiments, the testing system 318 is configured to perform the various tests on the sensor in a fully automated manner, for example through the use of automated test scripts. The testing system 318 may comprise a user interface through which an Acceptance Test Procedure (ATP) may be configured, whereby tests, speeds, positions, and other system settings are selected by an operator. Once the ATP is configured and started, the testing system 318 can control the position of the sensor 306 through the motor 326, the rotation of the ring 304 through the motor 324, and read the input sensor signal to perform the various tests.

Figure 5:
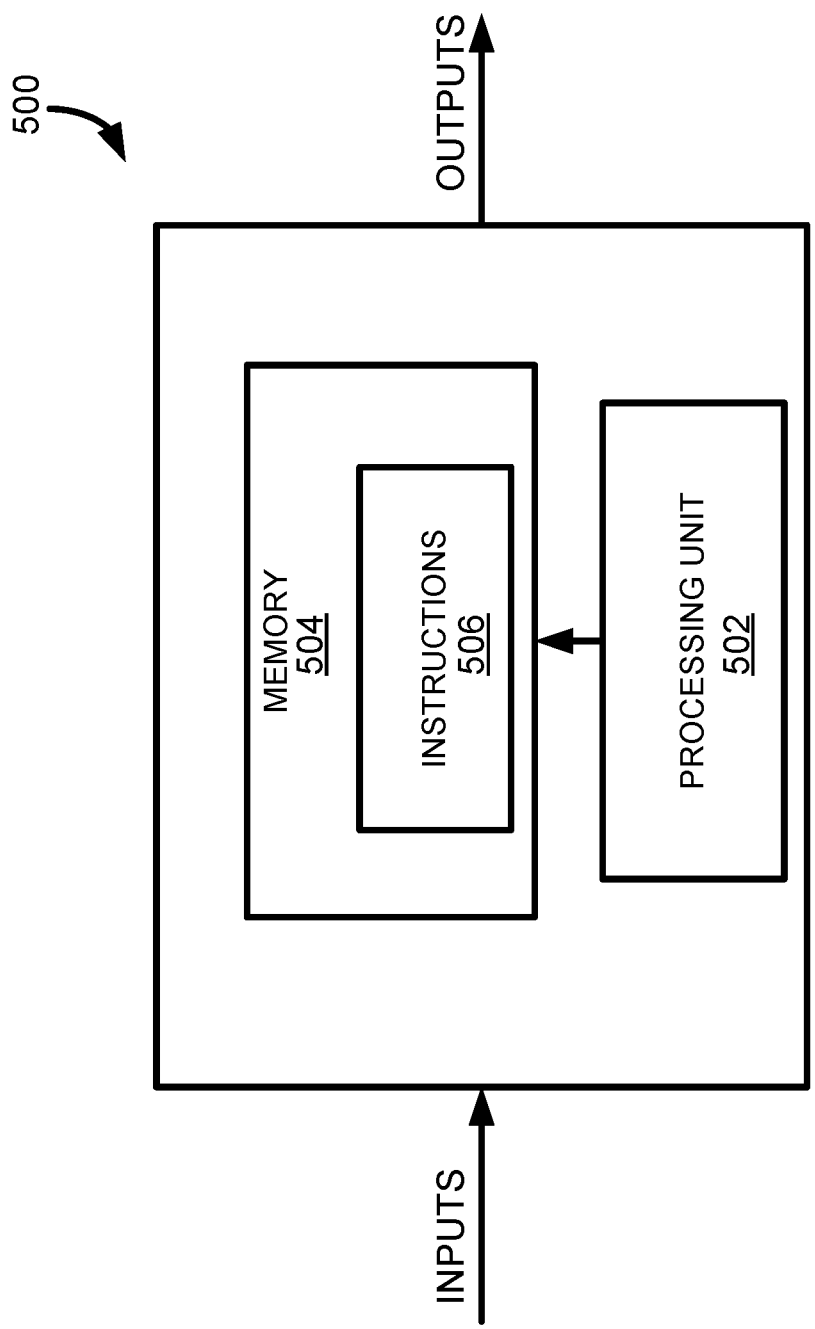
FIG. 5 is a block diagram of an example computing device.

With reference to FIG. 5, there is illustrated an embodiment of a computing device 500 for implementing part or all of the testing system 318 described above. The computing device 500 can be used to perform part or all of the functions of the test system 318. In some embodiments, the testing system 318 is composed only of the computing device 500. In some embodiments, the computing device 500 emulates the detection unit 308, as found in an engine controller of an engine 100 and forms a subset of the testing system 318. Although only one computing device 500 is illustrated, more than one computing device 500 may be used to implement the features of the testing system 318.

The computing device 500 comprises a processing unit 502 and a memory 504 which has stored therein computer-executable instructions 506. The processing unit 502 may comprise any suitable devices configured to implement the methods 400, 410, 420, 430 such that instructions 506, when executed by the computing device 500 or other programmable apparatus, may cause the functions/acts/steps performed as part of the methods 400, 410, 420, 430 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for testing a sensor of a propeller blade angle position feedback system described herein may be implemented in a high level procedural or object oriented programming or scripting language, or a combination thereof, to communicate with or assist in the operation of a computer system, for example the computing device 500. Alternatively, the methods and systems for testing a sensor of a propeller blade angle position feedback system may be implemented in assembly or machine language. The language may be a compiled or interpreted language. Program code for implementing the methods and systems for testing a sensor of a propeller blade angle position feedback system may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for testing a sensor of a propeller blade angle position feedback system may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the methods 400, 410, 420, 430.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, more or less than 17 position markers may be used on the ring, or the ring comprises an extra syncrophasing position marker which is detected and removed from the collected data. Yet further modifications could be implemented by a person of ordinary skill in the art in view of the present disclosure, which modifications would be within the scope of the present technology.

The invention claimed is:

1. A method for testing a sensor of a propeller blade angle position feedback system, the method comprising:
    causing a feedback device to rotate at a known rotational speed, the feedback device comprising a ring and at least one pair of position markers spaced from one another around a circumference of the ring;
    receiving a sensor signal from a sensor at a known position relative to the feedback device, the sensor configured for successively detecting passage of the position markers as the feedback device rotates at the known rotational speed and an axial distance between the sensor and the feedback device varies;
    determining from the sensor signal a measured position of the sensor relative to the feedback device and a measured rotational speed of the feedback device;
    comparing the measured position and the measured rotational speed to the known position and the known rotational speed to determine a sensor accuracy;
    accepting the sensor when the sensor accuracy is above a threshold; and
    rejecting the sensor when the sensor accuracy is below the threshold.

2. The method of claim 1, further comprising repeating the method at a plurality of rotational speeds and a plurality of known positions.

3. The method of claim 2, further comprising running a peak voltage detection test using the sensor signal when the known rotational speed corresponds to at least one of a minimum rotational speed and a maximum rotational speed.

4. The method of claim 3, wherein running the peak voltage detection test for the minimum rotational speed comprises selecting smallest positive and negative voltage magnitudes from the sensor over a complete revolution of the feedback device and comparing to a minimum voltage threshold.

5. The method of claim 3, wherein running the peak voltage detection test for the maximum rotational speed comprises selecting largest positive and negative voltage magnitudes from the sensor over a complete revolution of the feedback device and comparing to a maximum voltage threshold.

6. The method of claim 1, wherein the measured position of the sensor relative to the feedback device comprises an offset when a tolerance of a pole piece of the sensor is greater than a requirement.

7. The method of claim 6, further comprising determining the offset by computing a difference between the known position and the measured position with the sensor positioned at an axial determining position and the feedback device rotating at an offset determination speed.

8. The method of claim 7, wherein the sensor is rejected when the offset exceeds a threshold.

9. The method of claim 1, further comprising sending at least one position signal to at least one motor coupled to the sensor or to the feedback device to set the sensor and the feedback device to the known relative position.

10. The method of claim 1, further comprising sending at least one speed signal to at least one motor coupled to the feedback device to cause the feedback device to rotate at the known rotational speed.

11. A system for testing a sensor of a propeller blade angle position feedback system, the system comprising:

a feedback device comprising a ring and at least one pair of position markers spaced from one another around a circumference of the ring;

a sensor at a known position relative to the feedback device, the sensor configured for successively detecting passage of the position markers as the feedback device rotates at a known rotational speed and an axial distance between the sensor and the feedback device varies;

a processing unit; and a non-transitory memory having stored thereon program instructions executable by the processing unit for:

receiving a sensor signal from the sensor as the feedback device rotates at the known rotational speed and the axial distance between the sensor and the feedback device varies;

determining from the sensor signal a measured position of the sensor relative to the feedback device and a measured rotational speed of the feedback device;

comparing the measured position and the measured rotational speed to the known position and the known rotational speed to determine a sensor accuracy;

accepting the sensor when the sensor accuracy is above a threshold; and rejecting the sensor when the sensor accuracy is below the threshold.

12. The system of claim 11, wherein the program instructions are further executable for repeating the receiving of the sensor signal at a plurality of rotational speeds and at a plurality of known positions.

13. The system of claim 12, wherein the program instructions are further configured for running a peak voltage detection test using the sensor signal when the known rotational speed corresponds to at least one of a minimum rotational speed and a maximum rotational speed.

14. The system of claim 13, wherein running the peak voltage detection test for the minimum rotational speed comprises selecting smallest positive and negative voltage magnitudes from the sensor over a complete revolution of the feedback device and comparing to a minimum voltage threshold.

15. The system of claim 13, wherein running the peak voltage detection test for the maximum rotational speed comprises selecting largest positive and negative voltage magnitudes from the sensor over a complete revolution of the feedback device and comparing to a maximum voltage threshold.

16. The system of claim 11, wherein the measured position of the sensor relative to the feedback device comprises an offset when a tolerance of a pole piece of the sensor is greater than a requirement.

17. The system of claim 16, wherein the program instructions are further executable for determining the offset by computing a difference between the known position and the measured position with the sensor positioned at an axial determining position and the feedback device rotating at an offset determination speed.

18. The system of claim 17, wherein the sensor is rejected when the offset exceeds a threshold.

19. The system of claim 11, wherein the program instructions are further executable for sending at least one position signal to at least one motor coupled to the sensor or to the feedback device to set the sensor and the feedback device to the known relative position.

20. The system of claim 11, wherein the program instructions are further executable for sending at least one speed signal to at least one motor coupled to the feedback device to cause the feedback device to rotate at the known rotational speed.

* * * * *